J. R. REYBURN.
CHAIN CONNECTOR.
APPLICATION FILED MAR. 28, 1918.
1,284,774.
Patented Nov. 12, 1918.
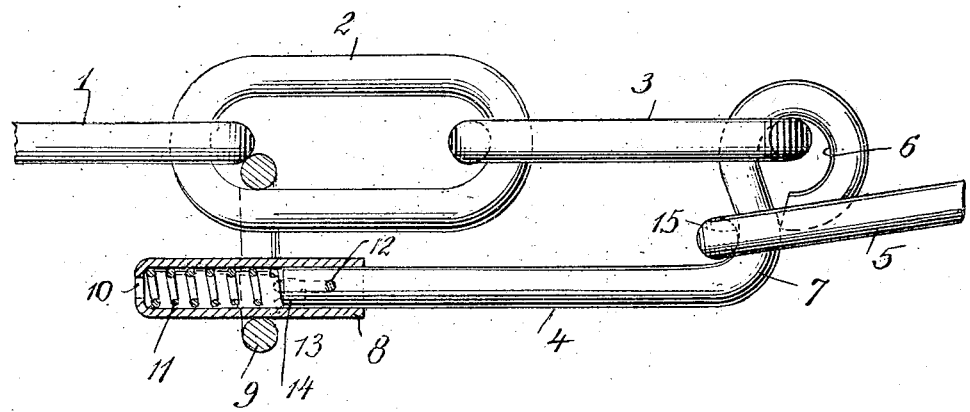

UNITED STATES PATENT OFFICE.

JOHN R. REYBURN, OF FAIRFIELD, CONNECTICUT, ASSIGNOR TO AMERICAN CHAIN COMPANY, INCORPORATED, OF BRIDGEPORT, CONNECTICUT, A CORPORATION OF NEW YORK.

CHAIN-CONNECTOR.

1,284,774.   Specification of Letters Patent.   Patented Nov. 12, 1918.

Application filed March 28, 1918. Serial No. 225,188.

*To all whom it may concern:*

Be it known that I, JOHN R. REYBURN, a citizen of the United States, and resident of Fairfield, Fairfield county, State of Connecticut, have made a certain new and useful Invention Relating to Chain-Connectors, of which the following is a specification, taken in connection with the accompanying drawing, which forms part of the same.

This invention relates especially to lever tightening chain connectors particularly adapted for tightening and detachably connecting the side chains of tire grips of the Weed-Parsons type. The connector may comprise a lever portion and a connector eye at one end adapted to be permanently connected to one of the end links of the side chain so that the connector lever may be inserted in one of the links at the other end of the side chain so that this link is engaged by a bend or socket in the lever which may then be forced around to tighten the side chain and bring the end of the connector adjacent one of the links to which it may be detachably connected by suitable securing or locking devices. These securing devices may with advantage sometimes comprise a securing loop permanently connected to one of the links adjacent the end of the side chain to which the connector lever is secured and the connector lever may be provided with a locking ferrule or member longitudinally movable or extensible with respect to the lever and preferably normally spring pressed outward into locking position. Thus when the locking member is retracted and the securing loop swung over the end of the connector lever the locking member may then be extended in any suitable way into its normal locking position securely retaining the connector in its closed connecting position until manually released.

The accompanying drawing shows in a somewhat diagrammatic way an illustrative embodiment of this invention, parts being shown in section for greater clearness.

The side chain of the Weed-Parsons type tire grip may comprise such links as 1, 2, 3, and the connector may be formed with a portion, such as the connector eye 6 permanently interlocked with or secured to the end link 3. The connector lever 4 is thus permanently secured to one end of the side chain and it may be provided with a curved portion 7 adjacent the eye so as to form a socket, such as 15, on the inside of the connector at this point to receive any one of the links, such as 5, at the other end of the side chain. When the side chain is being tightened and secured during the application of the chain grip, for example, the connector lever 4 is inserted in the link 5 which is manually or otherwise forced into coöperation with the socket 15 and then the connector lever 4 is swung from this inserting position in which the lever is more nearly in line with the end link 3 into about the locking or securing position indicated in the drawing, the link 5 being forcibly drawn toward the other end link 3 during this movement of the lever.

The connector is detachably locked in this connecting or securing position by suitable locking devices which may comprise the securing member or loop 9 permanently connected to one of the links 2 at the end of the chain to which the connector eye is secured and this securing loop 3 is preferably relatively narrow, so that the connector end cannot move into the top of this securing loop alongside the chain link 2 while this loop remains in the position indicated in the drawing.

An extensible locking member or ferrule 8 is also provided on the connector lever and this may be in the form of a tubular member or ferrule 8 loosely embracing the end of the connector lever and preferably formed of brass, bronze or other relatively non-corrodible material extensibly connected to the lever as by a pin and slot connection therewith. The ferrule may, for instance, be formed with the slot 13 in one or both of its sides to coöperate with the pin or connecting member 12 secured to the lever so that sufficient longitudinal movement is permitted between these parts to allow the securing loop to be swung over the end of the locking member when it is in its inward or retracted position. If desired, a suitable locking spring 11 may normally hold this locking member outward in connection with the retaining end 10 formed thereon so that when the securing loop is once swung around the locking member the ferrule can be released and then springs outward into the extended position indicated in the drawing which securely holds the parts in this connecting position. In this way the entire device is permanently connected to the chain end and cannot become lost or misplaced and the simplicity of the construction gives it increased strength and reliability of action, the relatively small amount of movement of the locking member also making it easy to force it inward and release the parts. This ferrule may be readily loosened sufficiently even when dirt and mud have worked in so that the spring restores it to its extended locking connecting position.

This invention has been described in connection with a number of illustrative embodiments, forms, proportions, parts, materials, arrangements and methods of manufacture and use, to the details of which disclosure the invention is not of course to be limited, since what is claimed as new and what is desired to be secured by Letters Patent is set forth in the appended claims.

I claim—

1. The chain connector adapted to tighten and detachably connect the ends of a tire grip side chain and comprising a connector lever formed with a connector eye permanently connected to one of the end links of the chain, a securing loop member adapted to be permanently connected to one of the adjacent end links of said chain, a locking ferrule member having a loose connection with the end of said connector lever and a locking spring normally forcing said ferrule member outward into extended locking position, said connector lever being adapted to be inserted through a link adjacent the other end of said chain and swung around to forcibly tighten said chain and be fastened in such connecting position by swinging said securing loop over the retracted locking member on the end of said connector lever.

2. The chain connector adapted to tighten and detachably connect the ends of a tire grip side chain and comprising a connector lever formed of round stock and provided with a connector eye and a chain having one of its end links permanently connected to said eye, a securing loop member permanently connected to one of the adjacent end links of said chain, a locking member having a loose connection with the end of said connector lever and a locking spring normally forcing said locking member outward into extended locking position, said connector lever being adapted to be inserted through a link adjacent the other end of said chain and swung around to forcibly tighten said chain and be fastened in such connecting position.

JOHN R. REYBURN.

Witnesses:
WILLIAM B. SIEGLER,
HAROLD J. HUNT.

Copies of this patent may be obtained for five cents each, by addressing the "Commissioner of Patents, Washington, D. C."